Oct. 19 1948.   W. G. HOUSTON   2,451,621
POWER CONTROL UNIT
Filed Feb. 25, 1946   3 Sheets-Sheet 1

INVENTOR.
Willard G. Houston
BY
William Cleland
Attorney

Oct. 19 1948.                     W. G. HOUSTON                        2,451,621
                                POWER CONTROL UNIT
Filed Feb. 25, 1946                                              3 Sheets-Sheet 2

INVENTOR.
Willard G. Houston
BY
William Cleland
            Attorney

Oct. 19 1948.    W. G. HOUSTON    2,451,621
POWER CONTROL UNIT
Filed Feb. 25, 1946    3 Sheets-Sheet 3
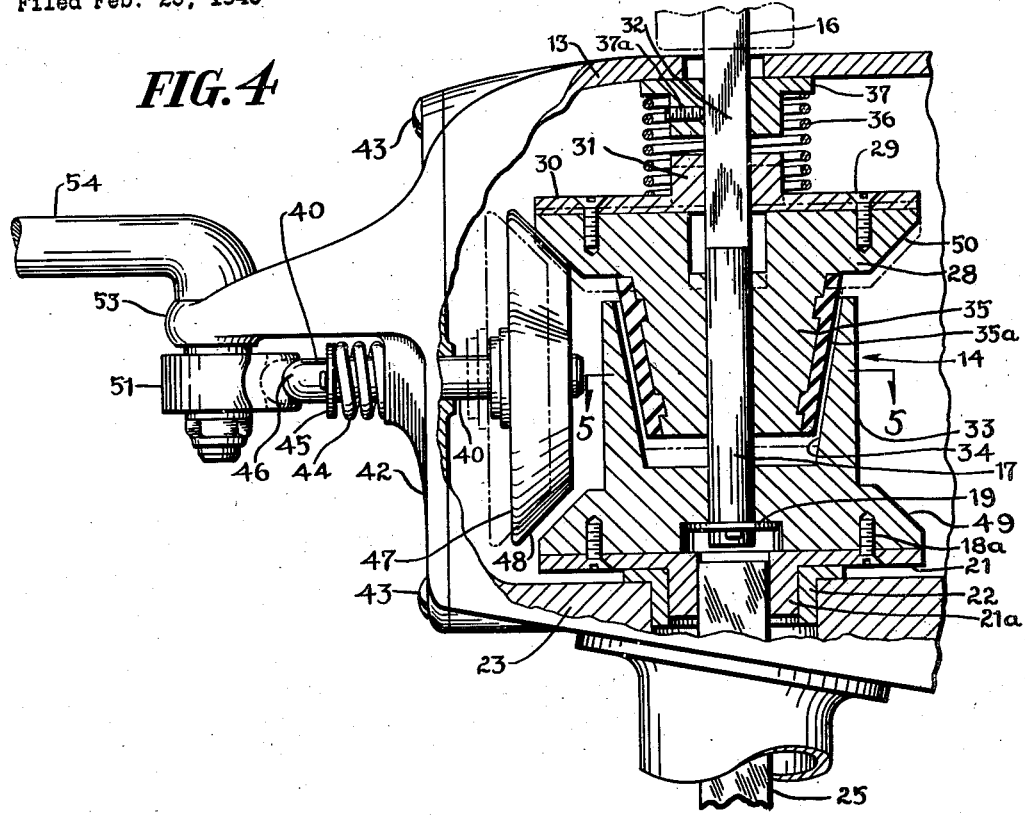
FIG.4
FIG.5
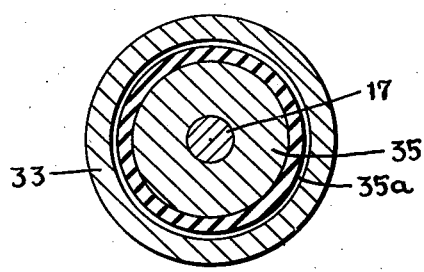
INVENTOR.
Willard G. Houston
BY
William Cleland
Attorney Patented Oct. 19, 1948

2,451,621

UNITED STATES PATENT OFFICE 2,451,621

POWER CONTROL UNIT

Willard G. Houston, Wadsworth, Ohio

Application February 25, 1946, Serial No. 649,826

7 Claims. (Cl. 74—205)

This invention relates to an outboard motor or like power control unit.

Heretofore many attempts have been made to produce means for controlling the power drive of outboard motors, for example, for the purpose of operating a propeller shaft in opposite directions. These attempts, however, have been unsuccessful because the mechanisms were either too expensive to manufacture or too bulky or inconvenient for practical use. Difficulties were presented particularly in the use of two cycle motors, because they could not be operated to a low speed without coming to a stop, and when they were operated at high speed the direction of the power transmission could not be changed without serious damage to the known types of control mechanisms.

One object of the present invention is to provide a control unit which is selectively operable, while the motor is running continuously, to transmit power between an input power shaft from the motor to an output propeller shaft for forward or reverse control, or operable to a neutral position in which no power would be transmitted to the propeller shaft.

Another object of the invention is to provide control unit of the character described which is simple, compact and economical to manufacture, and which may be operated to change the direction of the power transmission from an input shaft to an output shaft while the motor is either stopped or running at any speed, the neutral operation of the unit being particularly desirable for starting the motor.

Another object of the invention is to provide a power control unit of the character described which will require a minimum of lubrication.

Another object of the invention is to provide a control unit of the character described which requires little or no skill to operate, and which is fool-proof by virtue of the fact that it is operable at any speed of the motor through forward, neutral or reverse, in any order, without danger of damaging any of the parts of the mechanism.

Still another object of the invention is to provide a control unit for an outboard motor which in any condition of operation thereof may be utilized as a brake to stop a boat on which the motor is installed.

Still another object of the invention is to provide a control unit of the character described particularly adaptable for outboard motors, in which the control unit is located completely out of the water and therefore easily accessible for servicing.

These and other objects of the invention will be manifest from the following brief description and the accompanying drawings.

Of the accompanying drawings:

Figure 4 is a view similar to Figure 3 illustrating the control unit in the neutral position of operation thereof, the forward position of operation being shown in the chain-dotted lines.

Figure 5 is a cross-section taken substantially on the line 5—5 of Figure 4.

Figure 1:
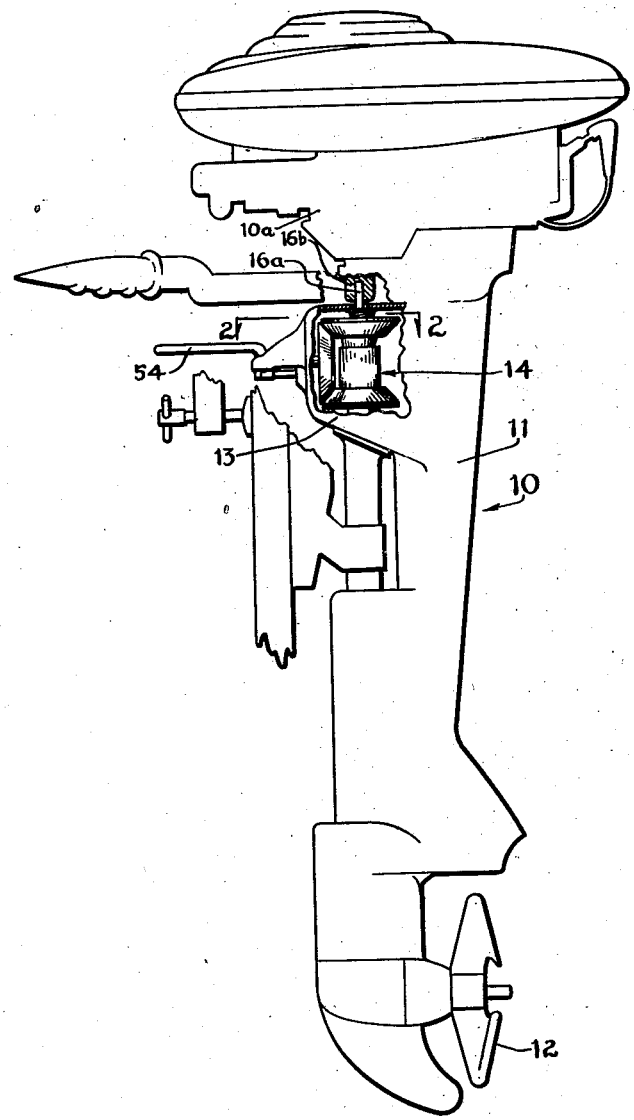
Figure 1 is a side elevation of an outboard motor unit having incorporated therein a power control unit embodying the features of the invention.

Referring particularly to Figure 1 the numeral 10 designates a portable outboard motor unit including a motor 10a and propeller shaft housing 11, the motor being adapted to operate the propeller 12 through a drive shaft in the housing 11. Integral with the housing 11 is a casing 13 for a power control unit 14 embodying the features of the invention. Motor unit 10 is adapted to be mounted on the stern board of a boat in the usual manner.

Figure 3:
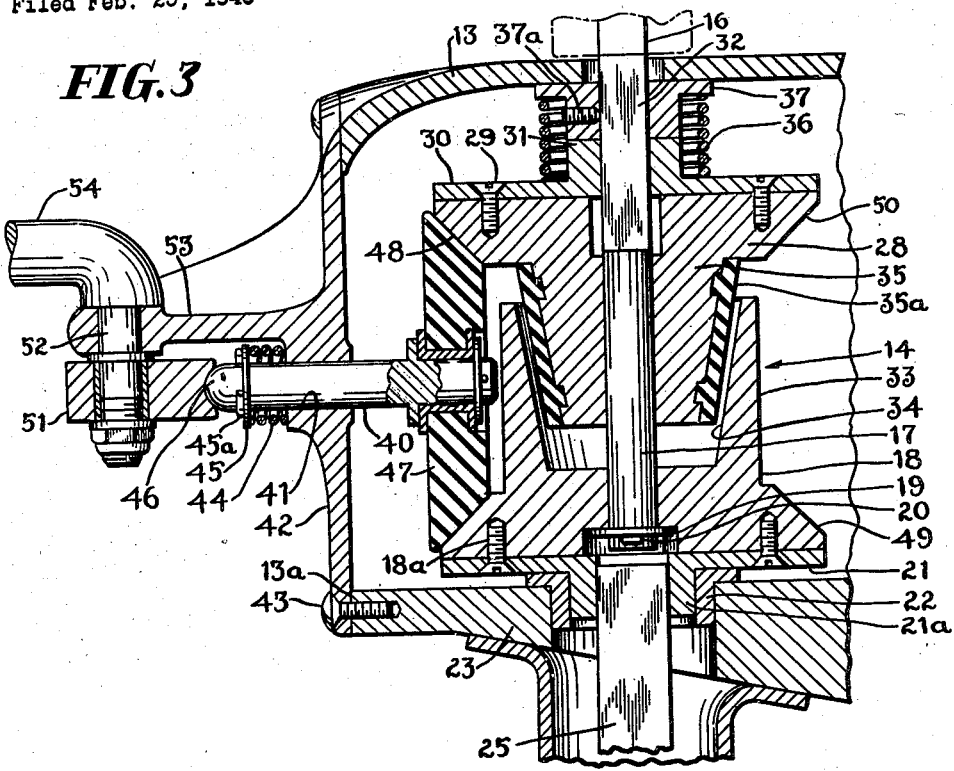
Figure 3 is a vertical cross-section taken substantially on the line 3—3 of Figure 2, the same illustrating the control unit in the reversing position of operation thereof.
Figure 2:
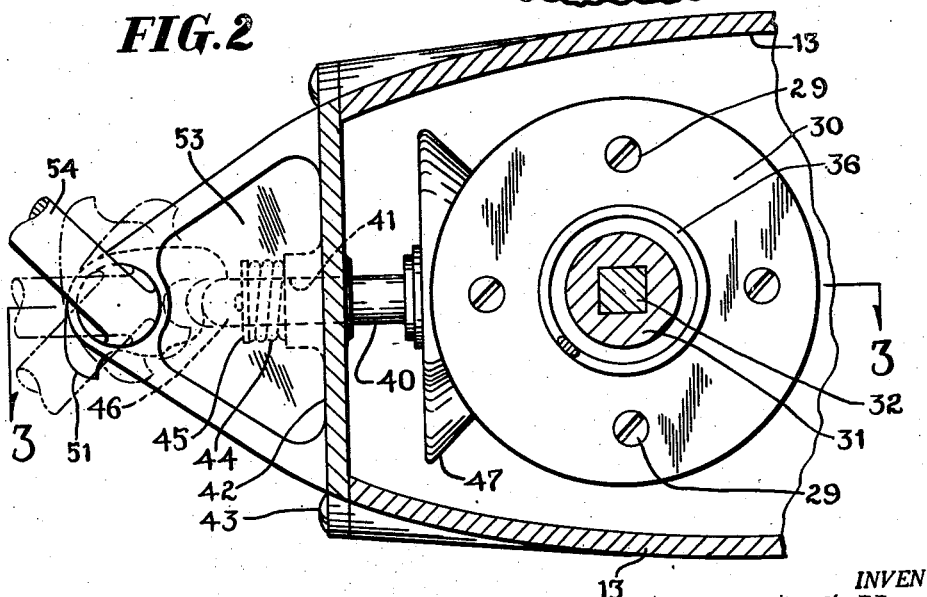
Figure 2 is a cross-section, partly broken away, through the control unit and taken substantially on line 2—2 of Figure 1.

Referring particularly to Figures 2 and 3 of the drawings, the numeral 16 designates a power input shaft the upper end of which is non-rotatably received in a socket 16a in a driving shaft 16b of motor 10, the shaft 16 extending into the casing 13. Rotatably mounted at a cylindrical lower end portion 17 of shaft 16 may be a rotary friction member 18, of steel or other suitable material, the same being retained on end portion 17 as by means of a washer 19 and cotter pin 20. Secured to the bottom face of rotary member 18, as by screws 18a, is a bearing cap 21 having a boss 21a journaled in a bearing sleeve 22 mounted in a bottom wall 23 of casing 13. The cap 21 may be non-rotatably received on a squared upper end portion of an output shaft 25 which drives propeller 12 in known manner, the shaft 25 being in axial alignment with input shaft 16. A rotary friction member 28, of material similar to member 18, is axially shiftably mounted on the cylindrical end portion 17 of shaft 16, above member 18. Secured to the upper face of member 28, as by means of screw 29, is a cap 30 similar to cap 21 having a boss 31 axially slidably received on a squared upper portion 32 of the shaft 16.

The member 18 is provided with an integral clutch element 33 having a female conical friction surface 34 of substantial area for receiving a complemental male conical friction element 35 on the friction member 28. The member 35 may have removably secured thereon a conical liner 35a of friction material, such as rubber, particularly adaptable for desired frictional engagement with the element 33. A strong compression spring 36 extends between cap 30 and a flanged collar 37 secured to the squared upper shaft portion 32, yieldingly to urge friction member 28 toward member 18, and thereby frictionally to engage the conical surfaces of clutch elements 33 and 35. The angle of the cones of the clutch elements is relatively small to provide maximum frictional engagement under the action of the spring, but large enough to obviate jamming action.

A stub shaft 40 may be axially slidably received in an apertured boss 41 of a closure plate 42, which is removably secured to the casing 13, as by means of screws 43, at an opening side thereof. The stub shaft 40 is made yieldingly shiftable inwardly of the casing by action of a compression spring 44, extending between the closure plate 42 and a washer 45 held adjacent the projecting outer end of the stub shaft by a cotter pin 45a. The axis of shaft 40 may be substantially midway between the lower and upper faces of the rotary members 18 and 28, respectively, in the power drive reversing positions thereof shown in Figure 3, and rotatably mounted on the inner end of this stub shaft may be an intermediate rotary friction member 47 of suitable friction material such as rubber, the member 47 having a conical friction surface 48 complementally engageable at diametrically spaced points with inwardly oppositely disposed conical friction surfaces 49 and 50 provided on the rotary members 18 and 28, respectively.

A suitable indexing cam 51, pivoted at 52 on a bracket 53 integral with closure plate 42, is operable by means of handle 54 to three indexed portions of engagement with a rounded outer end 46 of stub shaft 40, the arrangement being such that handle 54 is operable axially to shift the shaft 40 to three different positions of operation of the intermediate member 47, namely to forward, reverse and neutral positions of operation of the control unit. The handle 54, for example, is operable to turn indexing cam 51 and yieldingly shift stub shaft 40 axially outwardly, whereby intermediate member 47 is moved from the full line reversing position of Figure 3 to the full line position thereof shown in Figure 4, wherein it is out of frictional engagement with member 18. With this operation there occurs a relative sliding movement between the conical faces 48 and 50 of members 47 and 28 which allows the spring 36 to urge member 28 toward member 18, but not to a sufficient extent to permit frictional engagement of the conical clutch elements 33 and 35 thereof. Further outward movement of stub shaft 40, operated by the indexing handle and cam, will move the member 47 from its full line position in Figure 4 to the chain-dotted position therein, wherein member 47 is disengaged from both members 18 and 28 to allow spring 36 to urge the same together to full engagement of clutch elements 33 and 35. Thus it will be seen that the members 18, 28 and 47 are relatively movable to the different positions of frictional engagement or disengagement thereof, and of engagement or disengagement of the clutch elements, while the power input shaft 16 is rotating or not. Also the members are interengageable in reverse directions to apply braking power to the power output shaft 25.

It will be readily seen that the control mechanism is readily accessible as for servicing. For example, by loosening the screws 43, plate 42 is removable from casing 13 with stub shaft 40, friction member 47, and the associated indexing parts mounted thereon. After removing motor 10 from housing 11, set screw 37a (Figures 3 and 4) may be turned to loosen collar 37 on shaft 16, so that by lifting lower bearing cap 21 to clear sleeve 22 the shaft 16, with members 18 and 28, spring 36, and collar 37 retained thereon, may be removed as a unit through the opening at 13a in casing 13.

The rubber to metal contact between the intermediate member 47 and members 18 and 28 assures adequate frictional engagement between the same combined with maximum wear thereof.

In typical operation of the control unit, as for example, beginning with starting the outboard motor 10 from an inoperative condition thereof, the indexing handle 54 would be adjusted against the action of spring 44 to the full line neutral position of intermediate member 47 shown in Figure 2, in which the conical friction surface 48 of member 47 is engaging only the conical friction surface 50 of rotary member 28, and thereby holding the latter out of clutching engagement with the rotary member 18 against the yielding action of spring 36. Under this condition, the motor 10 is readily started because the drive between the input and output shafts 16 and 25, respectively, is disconnected so that the usual resistance of the propeller action in the water will not stall the motor. When the motor has acquired full or steady speed the handle 54 is operable to move intermediate member 47 outwardly to the chain-dotted position thereof of Figure 4, in which clutch 14 is frictionally engaged, as described, to provide a direct or forward power transmission between input shaft 16 and output shaft 25, whereby propeller 12 will be actuated to propel the boat in forward direction in the water. Usually, however, it is necessary to reverse the boat before it is clear of obstacles, such as other boats at a dock, before forward motion can be attained. In the latter instance the handle 54 is indexed to shift member 47 inwardly, first to engage member 18 and disconnect clutch 14 and then to engage also member 18 and thereby provide an indirect or reverse drive from the power input shaft 16 to the power output shaft 25.

Herein has been provided a novel power control unit for outboard motors which makes possible maximum maneuverability of a boat in water without requiring any substantial degree of skill on behalf of the boatman. Due to the fool-proof nature of the described control mechanism it is substantially impossible for the boatman to damage the parts thereof or to lose control of the boat.

It will be readily seen that the above described power unit is adaptable for uses other than with outboard motor units. For example, it is capable of effective use on power driven lawnmowers.

Modifications of the invention may be resorted to without departing from the spirit thereof or the scope of the appended claims.

What is claimed is:

1. A control unit of the class described comprising three relatively shiftable rotary friction members, means for rotatably mounting said members to be shiftable relatively of each other, clutch means for releasably connecting two of said members to rotate together in one condition of rotation thereof, means for selectively shifting said members from and toward a position in which said two members are in said clutching connection or shifting the members to different positions in which the third member is frictionally engageable either with one or with both of the others, for neutral or opposite conditions of rotation respectively of said two members, input power transmission means connected to one of said members, and output power transmission means connected to another of said members.

2. A control unit of the class described, comprising a pair of spaced rotary members having conical faces, means for mounting said spaced members to be relatively rotatable and axially shiftable relatively of each other, clutch means between said spaced members to be releasable and engageable by relative axial movement of the members, a third rotary member, means for mounting said third member intermediate said spaced members to be relatively shiftable toward and from the same, said third member having a conical face engageable at spaced points with said conical faces of the spaced members, means for selectively relatively shifting said spaced and said third members to relative positions in which said third member is disengaged from both said spaced members or engageable with one or both of said spaced members, input power transmission means connected to one of said members, and output power transmission means connected to another of said members.

3. A control unit of the class described, comprising a pair of spaced rotary members having conical faces disposed oppositely inwardly of each other, means for mounting said spaced members to be relatively rotatable and yieldingly axially shiftable relatively of each other, complemental conical clutch elements on said spaced members for frictional clutching engagement when the members are urged together, a third rotary member, means for mounting said third member intermediate said spaced members to be relatively shiftable toward and from the same, said third member having a conical face engageable at spaced points with said conical faces of the spaced members, means for selectively relatively shifting said spaced and said third members to relative positions in which said third member is disengaged from both said spaced member or engageable with one or both of said spaced members, input power transmission means connected to one of said members, and output power transmissions means connected to another of said members.

4. A control unit of the class described, comprising aligned shafts, spaced rotary members non-rotatably mounted on adjacent ends of said shafts to be yieldingly relatively shiftable from and toward each other, complemental conical clutch elements on said rotary members for frictional interengagement with each other when the rotary members are yieldingly urged together, rotational movement of one of said shafts thereby through said frictional engagement of the clutch elements translating direct driving power to the other shaft in one direction of rotation, an intermediate rotary member, means for rotatably mounting said intermediate member to be shiftable on an axis transversely of the axis of said spaced members, said spaced members and said intermediate member having conical friction surfaces, said intermediate member being axially shiftable inwardly from a fully disengaged position thereof in which said spaced members are rotating in said one direction to a position in which the conical friction surface thereof is engageable with said conical friction surface of one of said spaced members to disengage said clutch elements and the intermediate member being further shiftable axially inwardly to a position for frictionally engaging the other of said spaced members whereby one of said spaced members is driven by the other through said intermediate member in the opposite direction of rotation.

5. A control unit of the class described, comprising aligned shafts, spaced rotary members non-rotatably mounted on adjacent ends of said shafts to be yieldingly relatively shiftable from and toward each other, complemental conical clutch elements on said rotary members for frictional interengagement with each other when the rotary members are yieldingly urged together, rotational movement of one of said shafts thereby through said frictional engagement of the clutch elements translating direct driving power to the other shaft in one direction of rotation, an intermediate rotary member, means for rotatably mounting said intermediate member to be shiftable on an axis transversely of the axis of said spaced members, said spaced members and said intermediate member having conical friction surfaces, selectively operable indexing means for yieldingly axially shifting said intermediate member inwardly from a fully disengaged position thereof in which said spaced members are rotating in said one direction to a position in which the conical friction surface thereof is engageable with said conical friction surface of one of said spaced members to disengage said clutch elements and the intermediate member being further shiftable axially inwardly by said indexing means to a position for frictionally engaging the other of said spaced members whereby one of said spaced members is driven by the other through said intermediate member in the opposite direction of rotation.

6. A control unit of the class described, comprising aligned shafts, a first rotary member rotatably mounted at the end of one of said shafts and having a part thereof non-rotatably secured to an adjacent end of the other of said aligned shafts, a second rotary member non-rotatably mounted on said first shaft to be yieldingly axially shiftable relatively of said first rotary member, complemental conical clutch elements on said rotary members for frictional interengagement with each other when the rotary members are yieldingly urged together, rotational movement of one of said shafts thereby through said frictional engagement of the clutch elements translating direct driving power to the other shaft in one direction of rotation, an intermediate rotary member, means for rotatably mounting said intermediate member to be shiftable on an axis transversely of the axis of said spaced members, said spaced members and said intermediate member having conical friction surfaces, selectively operable indexing means for yieldingly axially shifting said intermediate member inwardly from fully disengaged position thereof in which said first and second members are rotatable in said one direction to a position in which said conical friction surface thereof is engageable with said conical friction surface of said second member to shift the same axially outwardly of said first member and thereby to disengage said conical clutch elements and release effective power transmission between said shafts and the intermediate member being further axially inwardly shiftable by said indexing means to a position for frictionally engaging said first member, whereby through frictional engagement of the conical friction surfaces of said first, second and intermediate members power is translated between said shafts to reverse directions of rotation thereof.

7. A control unit of the class described, comprising a pair of spaced rotary members having conical faces of relatively non-resilient material, means for mounting said spaced members to be relatively rotatable and axially shiftable relatively of each other, clutch means between said spaced members to be releasable and engageable by relative axial movement of the members, a third rotary member, means for mounting said third member intermediate said spaced members to be relatively shiftable toward and from the same, said third member having a conical face of rubber or like relatively resilient material engageable at spaced points with said conical faces of the spaced members, means for selectively relatively shifting said spaced and said third members to relative positions in which said third member is disengaged from both said spaced members or engageable with one or both of said spaced members, input power transmission means connected to one of said members, and output power transmission means connected to another of said members, said clutch means including complemental conical clutch elements carried by said spaced rotary members, one of said clutch elements having a conical friction surface of relatively non-resilient material and the other having a conical friction surface of rubber or like resilient material.

WILLARD G. HOUSTON.

REFERENCES CITED

The following references are of record in the file of this patent:

UNITED STATES PATENTS

| Number | Name | Date |
| --- | --- | --- |
| 534,536 | Wheeler | Feb. 19, 1895 |
| 624,973 | Probert | May 16, 1899 |
| 744,249 | Shore | Nov. 17, 1903 |
| 1,006,638 | English | Oct. 24, 1911 |